Jan. 16, 1962 D. E. MULLER 3,017,626

ASYNCHRONOUS ENCODER

Filed May 2, 1960 4 Sheets-Sheet 1

INVENTOR
D. E. MULLER
BY Lucian C. Canepa
ATTORNEY

ASYNCHRONOUS ENCODER

Filed May 2, 1960

INVENTOR
D. E. MULLER
BY Lucian C. Canepa
ATTORNEY

Jan. 16, 1962 D. E. MULLER 3,017,626

ASYNCHRONOUS ENCODER

Filed May 2, 1960 4 Sheets-Sheet 3

INVENTOR
D. E. MULLER
BY Lucian C. Canepa
ATTORNEY

INVENTOR
D. E. MULLER
BY Lucian C. Canepa
ATTORNEY

United States Patent Office 3,017,626

Patented Jan. 16, 1962

3,017,626

ASYNCHRONOUS ENCODER

David E. Muller, Urbana, Ill., assignor to Bell Telephone Laboratories, Incorporated, New York, N.Y., a corporation of New York Filed May 2, 1960, Ser. No. 26,277
14 Claims. (Cl. 340—347)

This invention relates to high speed encoders, and more particularly to speed-independent asynchronous encoders for converting pulse amplitude-modulated or P.A.M. messages into pulse code-modulated or P.C.M. messages.

In pulse code transmission the amplitudes of an analog message wave to be transmitted are sampled at successive instants which are equally spaced in time, the amplitude samples constituting a P.A.M. message. Each of these amplitude samples is then translated by means of an encoder into a group of pulses termed a pulse code group. A convenient code for this purpose is the $n$-digit binary code. Any binary code is capable of representing $2^n$ discrete values, where $n$ is the number of digits in the code. For example, with a 7-digit binary code, $2^7$ or 128 different values can be represented. Thus, each signal sample, which may have any amplitude of a continuous range, is translated in the 7-digit binary code into the nearest one of 128 different values. This process is termed "quantization." Each different quantized value is translated into a unique pulse code group for transmission over a communication channel to a receiving terminal. At the receiving terminal the received message, in the form of successive pulse code groups, is translated or decoded into successive quantized amplitude values, out of which the analog message wave is reconstructed.

Pulse code transmission offers marked advantages over other transmission forms because of the fact that substantially perfect regeneration can be carried out at the receiving terminal prior to decoding. Thus, when regeneration is employed, the only significant noise and distortion associated with the message at the receiving terminal are the noise and distortion which were contributed by the generator of the analog message wave and that arising from the quantization process.

In one well-known type of P.A.M.-to-P.C.M. encoder, the process of encoding each P.A.M. sample into an $n$-digit binary pulse code group is carried on in a digit-by-digit manner, most significant digit first, thus requiring $n$ digit decisions to completely encode a single P.A.M. sample. This type of encoding can be viewed as a geometric progression in which it is first determined in which half of the entire group of possible codes the P.A.M. signal sample should be placed; then it is determined in which quarter of the selected half the signal sample should be placed; next, it is determined in which eighth of the selected quarter the signal sample should be placed, and so forth. The process is carried on until the amplitude of the P.A.M. signal is specified to the desired degree of fineness. In order to determine the amplitude to one part in 128, in a coder of the type in which the coding steps are linearly related to the amplitude of the P.A.M. signal, seven separate digit decisions have to be made. One additional digit decision would, of course, permit determination to one part in 256. Furthermore, it is noted that, in a coder of the type in which the coding steps are not linearly related to the amplitude of the P.A.M. signal, seven separate digit decisions would permit determination over some portion of the possible range of amplitudes of the P.A.M. signals to a fineness greater than one part in 128.

Typically, P.A.M.-to-P.C.M. encoders of the sequential digit decision type operate in a synchronous manner. That is, the digit decisions therein take place under the control of a master clock or timing circuit. The time allowed for completion of a digit decision in such a typical encoder is designed to be sufficient for the completion of the single most time-consuming decision therein. Such an approach to the sequencing of the digit decisions of an encoder can obviously be very wasteful of time, for a given digit decision may require far less time than that allotted to it by the master timing signals.

An object of the present invention is the improvement of encoders.

More specifically, an object of this invention is to decrease the time required for a P.A.M.-to-P.C.M. encoder to convert a signal amplitude into a binary pulse code group.

Another object of the present invention is a high speed, reliable, speed-independent, asynchronous P.A.M.-to-P.C.M. encoder.

These and other objects of the present invention are realized in a specific illustrative encoder embodiment thereof which comprises two comparator circuits to one of which is coupled the input P.A.M. analog signal to be encoded and to the other of which is coupled the analog complement of the input P.A.M. signal. The complement of the input P.A.M. signal is the difference between the amplitude of the P.A.M. signal and the maximum signal amplitude. By maximum signal amplitude is meant the analog significance which would be assigned to the one next more significant digit than the most significant digit being coded.

The illustrative encoder also includes $n$ digit generator and store circuits which each of which a coupler or triggering circuit is associated. In response to asynchronously-occurring triggering signals applied to the coupler circuits, the digit generator and store circuits sequentially supply to each of the comparator circuits digital switching or "1" signals which are respectively representative of the $n$ digit positions of the code group which is employed to indicate the binary-coded equivalent of a P.A.M. sample.

In each comparator circuit the digital switching or "1" signal from the $i$th digit generator and store circuit is converted into an analog signal whose magnitude is representative of the binary significance of the $i$th digit position. In one comparator circuit this converted signal is compared with the amplitude of the input P.A.M. analog signal, and in the other comparator circuit the converted signal is compared with the amplitude of the complement of the input P.A.M. analog signal, the result of each comparison operation being a "0" signal if the input analog signal is greater than the converted analog significance signal and a "1" signal if the input analog signal is smaller than the converted analog significance signal.

The use of two comparator circuits to which are respectively coupled complementary input analog signals, and to each of which is coupled the same increment of converted analog significance signal, insures that the output signals of the comparator circuits are digitally complementary. That is, the signal outputs of the two comparator circuits are, as a result of a comparison operation, always "0" to "1." These digitally complementary output signals from the two comparator circuits represent a change-of-state from the normal output representation thereof in which each comparator circuit provides a "0" signal output indication. In turn, this change-of-state provides a signal by means of which to recognize that the comparator circuits have had sufficient time to complete their comparison operations.

More specifically, the change-of-state from the comparators is applied directly to the $i$th digit generator and store circuit, causing it to store a representation indicative of the comparison signal outputs of the two comparator circuits and to return to the comparator circuits digitally complementary switching signals, i.e., "0" and "1" signals, in place of the two "1" signals which previously caused the change-of-state. The parity of the newly complementary digital switching signals is such as to return the comparator circuits to their normal output representations, so that the comparator circuits are then ready to respond to digital switching signals from the $i+1$th and subsequent digit generator and store circuits. In turn, the alteration of the digital switching signals to a complementary state results in the application to the $i+1$th coupler circuit of two excitation signals which in combination cause the $i+1$th coupler circuit to apply an excitation to cause its associated or $i+1$th digit generator and store circuit to provide a digital switching or "1" signal to each of the comparator circuits.

Of the two excitation signals applied to the $i+1$th coupler circuit, the first one is applied directly to the $i+1$th coupler circuit and is also used internally in the $i$th digit generator and store circuit to lock therein against spurious alteration during subsequent comparison operations in the current coding sequence the stored representation indicative of the comparison signal outputs of the two comparator circuits during the $i$th digit comparison operation. The second excitation signal is applied to the $i+1$th coupler circuit after the $i$th digit generator and store circuit is locked. Also, the $i+1$th coupler circuit sends back to the $i$th coupler circuit a signal which resets the $i$th coupler circuit so that it is ready to respond to signals in the next coding sequence.

At the completion of $n$ sequential asynchronous comparison operations, the $n$ digit generator and store circuits have stored therein the binary digits of the pulse code group into which an input P.A.M. analog signal has been converted. At that time, the illustrative encoder gates the code group information stored in the digit generator and store circuits to a register circuit which, in turn, couples the code group or P.C.M. information to a communication channel for transmission to a receiving terminal.

Following the gating of information from the digit generator and store circuits to the register circuit, the digit generator and store circuits are cleared, another P.A.M. signal is presented to the two comparator circuits, a start signal is applied to the first or most significant digit coupler circuit, and the asynchronous encoding of another P.A.M. signal commences.

Thus, an encoder illustratively embodying the principles of this invention is characterized by an asynchronous mode of operation in which the completion of each of $n$ comparison operations is positively indicated by a signal derived from the digitally complementary outputs of the two comparator circuits thereof.

It is a feature of the present invention that a P.A.M.-to-P.C.M. encoder include two comparator circuits to one of which is coupled the input P.A.M. analog signal to be encoded and to the other of which is coupled the analog complement of the input P.A.M. signal.

It is another feature of this invention that an encoder for converting P.A.M. signals into $n$-digit binary pulse code groups include two comparator circuits, $n$ coupler circuits, and $n$ digit generator and store circuits, each digit generator and store circuit having associated therewith a coupler circuit and responding to a triggering signal from its associated coupler circuit by applying a digital switching signal to each of the comparator circuits, whereby, as a result of such applications, the comparator circuits provide digitally complementary output signals to sequentially trigger the coupler circuits in an asynchronous manner.

A complete understanding of the present invention and of the above and other objects, features, and advantages thereof may be gained from a consideration of the following detailed description of an illustrative embodiment thereof presented hereinbelow in conjunction with the accompanying drawing, in which.

Operation of an encoder which embodies the principles of the present invention is characterized by a system of checks which operates to inhibit every change-of-state until all necessary preliminaries to the change-of-state have been completed. The result is that all harmful races are eliminated from the asynchronous digital action of the encoder, but many races which are not harmful remain, to the advantage of the its over-all speed. (Races in the operation of asynchronous sequential logic circuits are discussed in a paper by G. H. Mealy, "A Method for Synthesizing Sequential Circuits," Bell System Technical Journal, Volume 34, Number 5, September 1955, pages 1045–1079.) More specifically, the result of the microcosmic application in the encoder of a system of checks is that its operation is speed-independent, in the manner discussed in a paper by D.E. Muller and W. S. Bartley, "A Theory of Asynchronous Circuits," Proceedings of an International Symposium on the Theory of Switching, Harvard University Press, 1959, which means, in general terms, that the final binary code resulting from the operation of the encoder on any P.A.M. sample is independent of any and all differences among operating speeds of the fundamental logical elements comprising the encoder.

Some examples of the operation of the system of checks which renders an encoder made in accordance with the principles of this invention speed-independent can be seen in the following detailed description of an illustrative embodiment thereof; but complete verification of the speed-independent nature of the encoder requires examination of its logical state diagram for semimodularity. From the description and accompanying drawing given here, the state diagram can be constructed by anyone skilled in the art of designing logical apparatus, and the conditions for semimodularity are described fully in the above paper by Muller and Bartley.

Figure 1:
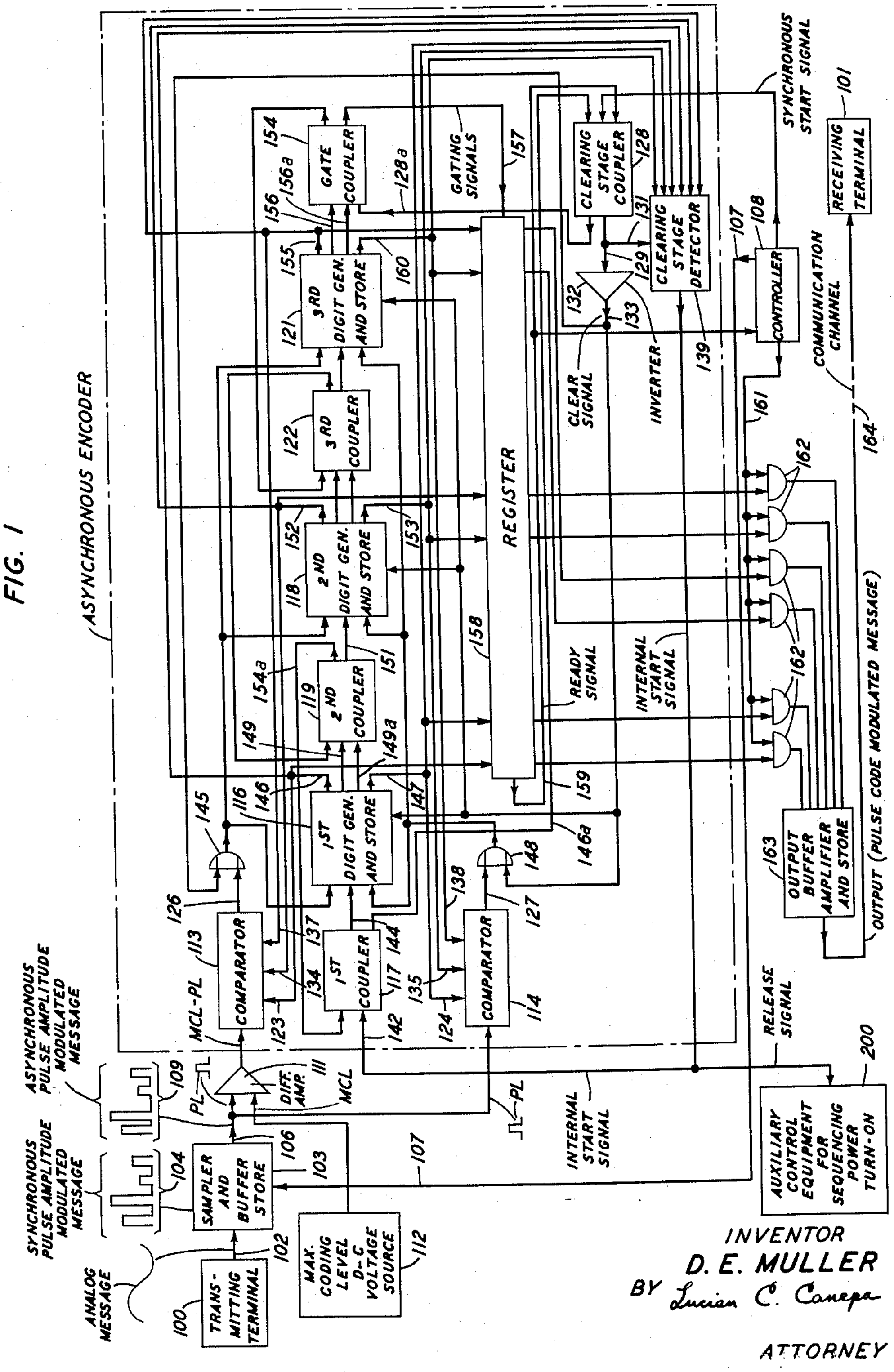
FIG. 1 is a block diagram of a communication system including an encoder which illustratively embodies the principles of the present invention.

Referring now to FIG. 1, there is shown a communication system including at one end thereof a transmitting terminal 100 and at the other end thereof a receiving terminal 101. The output of the transmitting terminal 100 is an analog message which is coupled over an electrical path 102 to a sampler and buffer store circuit 103. The analog message input to the circuit 103 may be regarded as a real, continuous function of time with a band limited spectrum. It is well known that if such a message is sampled at regular intervals and at a rate slightly higher than twice the highest frequency present therein, the samples will contain all of the information in the original message.

The sampler portion of the circuit 103 converts the input analog message coupled thereto into a series 104 of equally-spaced pulses whose amplitudes are related to the amplitudes of the input message at fixed intervals of time determined by the sampling frequency. These equally-spaced amplitude pulses are temporarily stored in the buffer storage portion of the circuit 103 and are sequentially coupled to an electrical path 106 in an asynchronous manner in response to the application to the circuit 103 of asynchronous timing signals from a controller circuit 108 over an electrical path 107.

In response to the application to the sampler and buffer store circuit 103 of a timing signal, one pulse of a series 109 of unequally-spaced amplitude output pulses of the circuit 103 is coupled to one input terminal of a difference amplifier 111, the amplitude of the coupled pulse being represented in FIG. 1 by the designation PL. The difference amplifier 111 includes a second input terminal to which is coupled from a maximum coding level direct-current voltage source 112 a voltage whose amplitude is equal to the maximum signal amplitude or the maximum coding level MCL. The maximum coding level MCL is the analog significance which would be assigned to the one next more significant digit than the most significant digit capable of being coded.

An asynchronous encoder illustratively embodying the principles of the present invention may be arranged to convert a P.A.M. signal into an *n*-digit pulse code group. A convenient code for this purpose, and the one which will be emphasized herein, is the *n*-digit binary pulse code group. It is to be understood, however, that the principles of the present invention are also applicable to encoders that employ binary elements and which provide nonbinary pulse code group outputs. Herein, in the interests of simplicity and clarity of presentation, *n* has been chosen to be only 3. It is to be understood, however, that the principles and circuits described herein are equally applicable to encoders wherein *n* is selected to be some higher number, such, for example, as 7, which would provide a greater number of different values into which to convert P.A.M. signals, thereby improving the granularity of the converted signals and, also, decreasing background noise when the signals are reproduced at a receiving terminal.

The specific illustrative asynchronous encoder shown in FIG. 1 includes two comparator circuits 113 and 114 to one 113 of which are coupled the outputs of the difference amplifier 111, viz., pulses whose amplitudes are equal to the maximum coding level MCL less the pulse levels PL, and to the other one 114 of which are directly coupled the pulse levels PL. In other words, the analog input pulse level PL is directly coupled to one of the comparator circuits while the complement thereof, that is, MCL—PL, is applied to the other comparator circuit.

Also coupled to each of the comparator circuits 113 and 114 are digital switching signals from circuits respectively representative of the *n* digit positions of the P.C.M. binary code group into which a single P.A.M. signal is to be converted. These circuits comprise a most significant digit or first digit generator and store circuit 116 and a first coupler circuit 117 associated therewith, a second digit generator and store circuit 118 and a second coupler circuit 119 associated therewith, and a least significant digit or third digit generator and store circuit 121 and a third coupler circuit 122 associated therewith.

To remove the possibility of the level PL exceeding the level MCL and thereby interfering with the intended operation of the illustrative encoder, the system described herein should include a P.A.M. signal limiter to limit the amplitudes of the output pulses of the circuit 103 at the level MCL. Such a limiter might, for example, be added to the circuit 103.

Figure 2A:
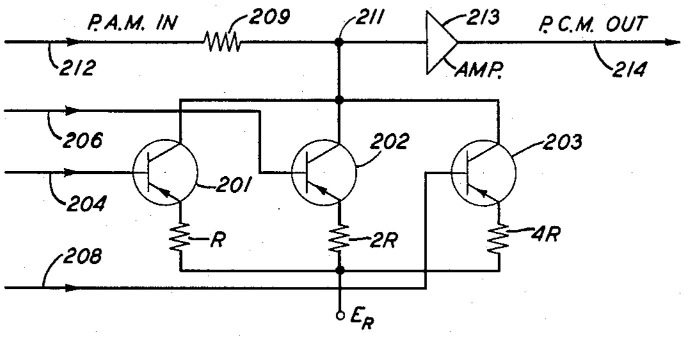
FIG. 2A depicts a comparator circuit of the type included in the illustrative encoder of FIG. 1.

Each of the comparator circuits 113 and 114 may, advantageously, be of the type described by B. D. Smith in "Coding by Feedback Methods," Proceedings of the I.R.E., August 1953, pages 1053–1058. One specific arrangement of such a circuit is depicted in FIG. 2A and is seen to include three transistors or switches 201, 202, and 203 which are respectively controlled by digital switching signals applied to leads 204, 206, and 208 from circuits respectively representative of the most significant digit, next most significant digit, and the least significant digit of the binary digits of a pulse code group. Thus, for example, the application of a digital switching signal to the transistor 201 will cause its collector-to-emitter impedance to assume a low value and will cause a current of a predetermined value to flow from a source of reference potential $E_R$ through a series resistor R to a node point 211. Also coupled to the node point 211 is a resistor 209 through which flows a current that results from the application of a P.A.M. input signal to a lead 212. In turn, an amplifier 213 of the zero-crossing trigger type couples to an output lead 214 a P.C.M. binary signal representative of the relative magnitudes of the two currents which flow to the node point 211.

Thus, it is seen that a digital switching signal applied to the lead 204 is converted into a magnitude of current (that is, an analog signal) and then compared with an input P.A.M. analog current. Similarly, the application of a digital switching signal to the lead 206 closes the switch 202 and causes a current of a predetermined value to flow from the source $E_R$ through a series resistor 2R to the node point 211. Further, the application of a digital switching signal to the lead 208 closes the switch 203 and causes a current of a predetermined value to flow from the source $E_R$ through a series resistor 4R to the node point 211.

The values of the series resistors R, 2R, and 4R of the typical comparator circuit shown in FIG. 2A are such that the closing of only the switch 201 will cause four-sevenths of the total current that can flow through the resistors R, 2R, and 4R in parallel to flow. Also, the closing of only the switch 202 will cause two-sevenths of the total possible current to flow, and the closing of only the switch 203 will cause one-seventh of the total possible current to flow.

The leads 204, 206, and 208 of the circuit of FIG. 2A may be associated with appropriate switching circuits which apply a digital switching signal to the lead 204 to close the switch 201 and, if the converted signal current is less than the P.A.M. signal current, leave the switch 201 closed and then apply a digital switching signal to the lead 206 to close the switch 202 or, if the converted signal current is more than the P.A.M. signal current, open the switch 201 and then apply a closing signal to the switch 202, and so forth.

This type of coding can be viewed as a geometric progression in which it is first determined in which half of the entire group of possible codes the P.A.M. signal sample should be placed; then it is determined in which quarter of the selected half the signal sample should be placed; next, the eighth of the selected quarter is determined.

Figure 2B:
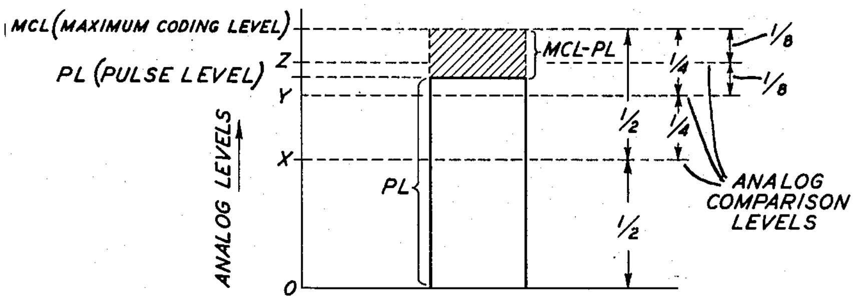
FIG. 2B is a graphical aid to an understanding of the mode of operation of the illustrative encoder shown in FIG. 1.

The above-specified manner of operation of a typical linear comparator circuit is graphically illustrated in FIG. 2B. There is shown an input P.A.M. analog pulse of amplitude PL, the maximum coding level MCL, and the analog comparison levels derived from digital switching signals respectively representative of the most significant digit position, the next most significant digit position, and the least significant digit position. Thus, the analog level X is derived from a digital switching signal supplied by circuitry representative of the most significant digit position. This level X is less than the illustrative P.A.M. pulse level PL and a typical comparator circuit could, for example, be arranged to provide "0" output signal to indicate this relationship between the two analog signal magnitudes.

The analog level Y shown in FIG. 2B is derived from digital switching signals supplied by circuitry representative of both the most significant digit position and the next most significant digit position. Since this level is also less than the depicted P.A.M. pulse level PL, the typical comparator circuit of the type shown in FIG. 2A would again provide a "0" output signal. Finally, a comparison between the P.A.M. pulse level PL and the analog level Z, which level Z is derived from digital switching signals supplied by the circuitry representative of the most significant digit position, the next most significant digit position, and the least significant digit position, would cause the comparator circuit to provide a digital output signal of the opposite type, viz., a "1" signal, to indicate that the converted analog level Z is greater than the P.A.M. input level PL. Note that the output of the comparator circuit responds to the application thereto of the pulse level PL and either the level X or the level Y or the level O by providing the same output indication, viz., a "0" signal. Thus, circuitry responsive to these output signals would have no way of knowing when the comparison operation between the levels X and PL had been completed and when to begin a comparison operation between PL and an analog level derived from a different digit position of the binary pulse code group. This difficulty or absence of a positive indication that a given comparison operation has been completed can, of course, be resolved by controlling a single comparator circuit with master clock or timing signals whose periodicity is arranged to be what the designer thinks is sufficient to allow for the completion in the circuit of the single most time-consuming comparison operation. Such a synchronous approach may, however, be unduly wasteful of time, for a given comparison operation may require far less time than that allotted to it by the master timing signals. An asynchronous comparison circuit arrangement, which can provide a positive indication of the fact that the circuit has completed one comparison operation and is ready at that time to commence the beginning of another, can perform a given set of comparison operations in less time than that required by its synchronous counterpart.

The essential basis for an asynchronous encoder, namely, a positive indication that one comparison operation has been completed and that another may accordingly begin, is supplied in accordance with the principles of the present invention by providing two comparator circuits, to one of which the P.A.M. pulse level PL is applied and to the other of which the maximum coding level MCL less the level PL is applied. In accordance with this approach, every comparison operation causes one or the other of the comparator circuits to change its output condition and thereby provide a positive change-of-state signal to initiate a succeeding comparison operation.

More specifically, assume that the comparator circuit 113 of FIG. 1 has a signal of level MCL—PL applied to one input terminal thereof and that the comparator circuit 114 has a signal of level PL applied to one input terminal thereof. Further, assume that initially no digital switching signals are supplied to the circuits 113 and 114 from the digit generator and store circuits 116, 118, and 121. Accordingly, the analog input levels MCL—PL and PL will be respectively compared by the circuits 113 and 114 with converted analog signals each of zero amplitude and, as a result, the output of each of the circuits 113 and 114 will be a "0" signal, thereby indicating that the analog signal inputs thereto are greater than the converted analog significance signal inputs applied thereto. Now, assume that the most significant digit or first digit generator and store circuit 116 supplies to the comparator circuits 113 and 114 on leads 123 and 124, respectively, digital switching signals which are converted by the circuits 113 and 114 into analog signals of level X (FIG. 2B), which is half the maximum coding level. The comparator circuit 114 compares the levels PL and X and, as a result of the comparison, continues to provide on its output lead 127 a digital "0" signal to indicate that the input P.A.M. signal of level PL is still greater than the converted analog signal. The comparator circuit 113, however, compares the level X and the complement of the level PL, namely, the level MCL—PL, and, as a result thereof, changes the "0" signal indication on its output lead 126 to a "1" signal to indicate that the input analog signal of level MCL—PL is less than the converted analog signal of level X. Thus, when the specified comparison operation is performed in accordance with the principles of this invention, there is provided a positive indication or change-of-state at the outputs of the circuits 113 and 114; whereas, as described hereinabove, a comparison operation over the same range of analog levels with a single comparator circuit does not provide such a positive indication.

The illustrative encoder embodiment shown in FIG. 1 can best be understood by tracing through one complete cycle of operation thereof. Assume, to begin with, that a "1" signal appears on each of the output leads of the coupler circuits 117, 119, 122, and 154, and that a "0" signal appears on the reset output lead 128*a* of the clearing stage coupler circuit 128. This set of initial conditions can be established at the time the coding equipment is turned on by means of auxiliary controls applied to certain of the power sources which supply biasing current to portions of the coupler circuits, as will be discussed below in describing details of the coupler circuits. (In the course of the normal operation of the encoder, this set of conditions arises naturally at the end of each coding sequence.) Further, assume than at analog message is present on the transmitting terminal output lead 102, and that a portion of a synchronous pulse amplitude-modulated message 104 derived therefrom is present in the buffer store portion of the sampler and buffer store circuit 103. Finally, assume that the controller circuit 108 supplies a timing signal on the lead 107 to the sampler and buffer store circuit 103 and allows time for the circuit 103 and the amplifier 111 to respond to the timing signal by applying pulses of amplitudes MCL—PL and PL to the comparator circuits 113 and 114, respectively, and that the circuit 108 then applies a synchronous start signal, that is, a "0" signal, to the clearing stage coupler circuit 128. (Note that the controller circuit 108, the amplifier 111, the sampler and buffer store circuit 103, and associated circuitry are not speed-independent asynchronous circuits, but rather a part of the coupling between a necessarily synchronous environment and the encoder itself, which is a speed-independent asynchronous circuit. It is therefore not anomalous to provide a fixed delay between signals to allow for completion of an operation in this peripheral equipment which is not speed-independent.)

Following the appearance of a quiescent or "1" signal on a gating signal lead 157 from the gate coupler circuit 154, a "0" signal appears on a ready signal lead 159. The coincidence of the synchronous start signal with the "0" signals on the leads 159 and 128*a* produces a "0" signal on each of the output leads 129 and 131. The "0" signal on the lead 129 is applied to the input terminal of an inverter circuit 132, thereby providing on the output lead 133 thereof a "1" or clear signal which is applied to every one of the digit generator and store circuits 116, 118, and 121. This clear signal causes the most significant digit or first digit generator and store circuit 116 to apply "0" signals, by means of the leads 123 and 124, to the comparator circuits 113 and 114, respectively; causes the next most significant digit or second circuit 118 to apply "0" signals, by means of leads 134 and 136, to the comparator circuits 113 and 114, respectively; and causes the least significant digit or third digit generator and store circuit 121 to apply "0" signals, by means of leads 137 and 138, to the comparator circuits 113 and 114, respectively. These "0" signal outputs of the digit generator and store circuits 116, 118, and 121 are also coupled to all but one of the input terminals of a clearing stage detector circuit 139. The other input terminal of the circuit 139 has applied thereto over the lead 131 a "0" signal from the output of the clearing stage coupler circuit 128.

The output of the clearing stage detector circuit 139 of the illustrative embodiment depicted in FIG. 1 is a "1" or internal start signal which is applied to an input terminal 142 of the first coupler circuit 117. In case the power has just been turned on and the initial conditions are being maintained by auxiliary control of biasing currents supplied to the various coupler circuits, as mentioned above, the "1" signal output of the clearing stage detector circuit 139 also releases the coupler circuits from this auxiliary control. The application of the internal start signal to the first coupler circuit 117 is acknowledged by returning a "0" signal to the clearing stage coupler circuit on a lead **146*a*. The coincidence of "0" signals on the leads 146*a* and 159 now causes the clearing stage coupler circuit 128 to supply a "1" signal on its reset output lead 128*a* and, whenever the synchronous start signal has returned to "1", a "1" signal on output leads 129 and 131. The latter signal results in the removal of the aforementioned clear signal from each of the digit generator and store circuits 116, 118, and 121 and in the eventual removal of the internal start signal from the input of the first coupler circuit 117. The removal of the internal start signal from the input of the first coupler circuit 117 causes the circuit 117 to supply on an output lead 144 thereof, a triggering or "0" signal to the first digit generator and store circuit 116**.

As a result of the triggering signal applied to one of the input terminals of the digit generator and store circuit 116 by the first coupler circuit 117, the circuit 116 provides on each of its output leads 146 and 147 a "1" signal, which signals are coupled to the comparator circuits 113 and 114 by the leads 123 and 124, respectively. One of the comparator circuits, say, for example, the circuit 113, then provides an output signal indicative of the relative magnitudes of the inputs applied thereto, namely, the level MCL—PL and the level equal to one-half of the maximum coding level. Assume, for the purpose of illustration, that the level MCL—PL is less than half of the maximum coding level. The output of the comparator circuit 113 on the lead 126 will, therefore, change from its initial indication, viz., a "0" signal, to a "1" signal indication. The output of the other comparator circuit 114 will, under these conditions, be the digital complement of the signal appearing on the lead 126 of the circuit 113. In other words, the circuit 114 continues to provide a "0" signal output on the lead 127, thereby indicating that the level PL is greater than half the maximum coding level. The change-of-state on the lead 126, i.e., the change from an initial "0" signal indication to a "1" signal indication, is applied through an OR circuit 145 to an input of each of the digit generator and store circuits 116, 118, and 121.

The coincidence of "1" signals on leads 146 and 147 produces "1" signals on the input leads 149 and **149*a* to the second coupler circuit 119, making it ready for an energizing, or "0" signal to be applied later, and it acknowledges its readiness by returning a "0" signal on its reset output lead 154*a* to the first coupler circuit 117. In turn, the circuit 117 changes both its output signals to "1", and the coincidence of the "1" signals on leads 144 and 149*a* with the "1" signal indication arriving from the comparator circuit 113 causes the first digit generator and store circuit 116 to return to a "0" indication the signal on its output lead 146. Now, although the change-of-state on the lead 126 is applied as described above to an input of each of the digit generator and store circuits 116, 118, and 121, only the circuit 116 has been primed by establishing the peculiar coincidence of "1" signals described above and, so, only the cricuit 116 responds to the change-of-state of the output of the comparator circuit 113. The response of the circuit 116 to the noted change-of-state is to return to a "0" indication the signal which the circuit 116 supplies to the circuit 113 over the leads 146 and 123. This then causes the circuit 113 to provide a "0" output signal on the lead 126, and, since the output signal of the comparator circuit 114 remained at "0" during the entire first comparison operation, the outputs of the circuits 113 and 114** are, at the completion of the first comparison operation, what they were prior to the commencement thereof, namely, two "0" signal outputs.

The new disagreement of signal indications on the leads 146 and 147 causes the digit generator and store circuit 116 to apply an excitation or "0" signal to the lead 149. The excitation signal on the lead 149 is applied to an input of the second coupler circuit 119 and is also used internally in the first digit generator and store circuit to lock its stored representation of the result of the first digit comparison operation against spurious alteration during subsequent comparison operations in the current coding sequence. A second excitation or "0" signal is applied to the second coupler circuit 119 on the lead **149*a* after the first digit generator and store circuit is locked, and the coincidence of the "0" signals on the three leads 149, 149*a*, and 154*a* causes the second coupler circuit 119 in turn to apply an energizing or "0" signal over the lead 151 to cause the second digit generator and store circuit 118 to provide a "1" signal on each of its output leads 152, 153, and so forth in a manner identical to that specified above in connection with the description of the operation of the first or most significant digit comparison operation. Further, the second coupler circuit 119 provides on the lead 154*a* an output or reset signal which is coupled back to an input of the first coupler circuit 117 to reset the circuit 117** so that it will be ready for the next internal start signal.

Following the completion of the third comparison operation, the least significant digit or third digit generator and store circuit 121 provides a pair of energizing signals on leads 156 and **156*a* to a gate coupler circuit 154. (At this point in the cycle of operation of the specific illustrative encoder of FIG. 1, the digit generator and store circuits 116, 118, and 121 have stored therein the binary digits of a pulse code group representative of the P.A.M. analog signal level PL.) The application of the energizing signals to the gate coupler circuit 154 causes the circuit 154 to provide a gating signal on a lead 157 to enable gate circuitry in a register circuit 158, thereby reading out in a parallel fashion the binary digits stored in the digit generator and store circuits 116, 118, and 121 into corresponding flip-flop circuits in the register circuit 158. After all of the register flip-flops have responded to the gating signal from the gate coupler circuit 154, a ready signal appears on an output lead 159 of the register circuit 158. This ready signal is applied to an input terminal of the clearing stage coupler circuit 128 and, also, to an input terminal of the controller circuit 108. The controller circuit 108 responds to the application thereto of the ready signal by applying a timing signal to the sampler and buffer store circuit 103. In turn, the circuit 103 responds to this timing signal by presenting on its output lead 106** another P.A.M. analog input signal to be encoded.

The controller circuit 108 also responds to the application thereto of the ready signal by supplying an enabling signal on a lead 161 to a group of six AND circuits 162, through which AND circuits 162 the coded information stored in the register 158 may be gated in parallel to an output buffer amplifier and store circuit 163. The output of the circuit 163 is coupled to one end of a communication channel 164, whose other end is coupled to the receiving terminal 101.

Alternatively, the register may be omitted and each digit of the pulse code group may be coupled to the communication channel following the asynchronous generation of the digit.

Further, the controller circuit 108 responds to the application thereto of the ready signal by applying a synchronous start signal to an input of the clearing stage coupler circuit 128, thereby initiating in the encoder another complete cycle of operation thereof.

Figure 3A:
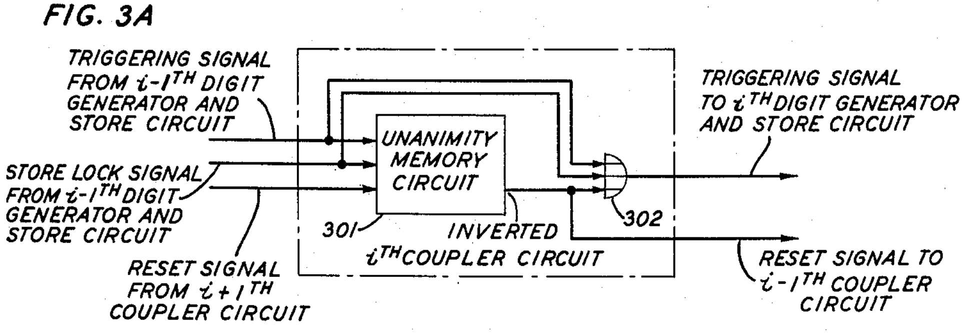
FIG. 3A illustrates the configuration of one of the second and third coupler circuits of the illustrative encoder embodiment of FIG. 1.

Turning now to some details of the circuit blocks of FIG. 1, FIG. 3A depicts the configuration of one of the second and third coupler circuits 119 and 122. More generally, FIG. 3A shows an illustrative configuration of the *i*th coupler circuit of an encoder embodiment of the principles of the present invention. The *i*th circuit is intended to show the form of all of the encoder coupler circuits except the first coupler circuit, the gate coupler circuit, and the clearing stage coupler circuit. These excepted coupler circuits are shown in FIGS. 3B, 3C, and 3D, respectively.

The configuration of FIG. 3A includes a unanimity memory circuit 301 and an OR circuit 302, which are interconnected as shown in FIG. 3A and whose input and output signals are of the type there specified. It is noted that an illustrative embodiment of a unanimity memory circuit is shown in FIG. 3E and is described hereinbelow. The respective application of identical signals representative of one binary value to the *n* input terminals of a unanimity memory circuit provides at the output terminal thereof a binary output signal of one type. Then, as nonidentical input signals are applied to the circuit, the output signal thereof remains unchanged, only changing to a representation of the other binary type in response to the respective application to the *n* inputs of identical signals of the other binary value. The output signal may be of the same binary value as the input signals which unanimously established it (noted on the drawing as "noninverted") or of the binary value opposite that of the input signals which established it (noted on the drawing as "inverted"). More specifically, in the encoder considered herein, the respective application of "0" signals to the *n* inputs of a unanimity memory circuit provides a "1" inverted output signal or a "0" noninverted output signal, which persists until "1" signals are respectively applied to the *n* input terminals thereof, at which time the inverted output becomes a "0" signal and the noninverted output becomes a "1" signal. Then, in a similar manner, the "0" or inverted output signal persists until "0" signals are respectively applied to the *n* input terminals, at which time the inverted output is a "1" indication again.

Figure 3B:
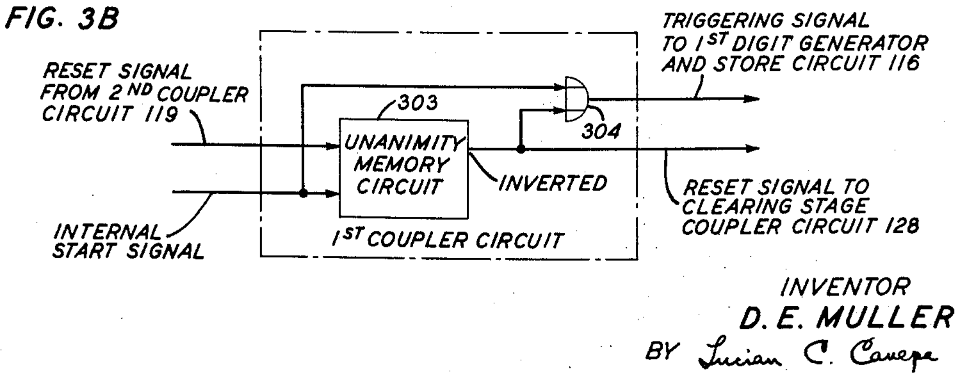
FIG. 3B shows the configuration of the first coupler circuit of the encoder of FIG. 1.
Figure 3C:
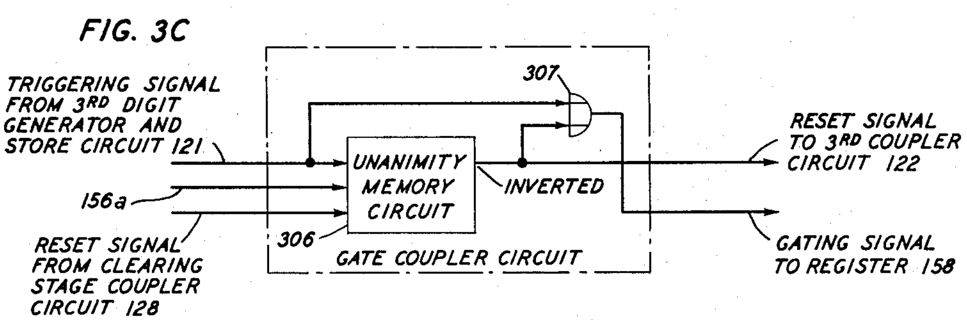
FIG. 3C shows the configuration of the gate coupler circuit of the encoder of FIG. 1.
Figure 3D:
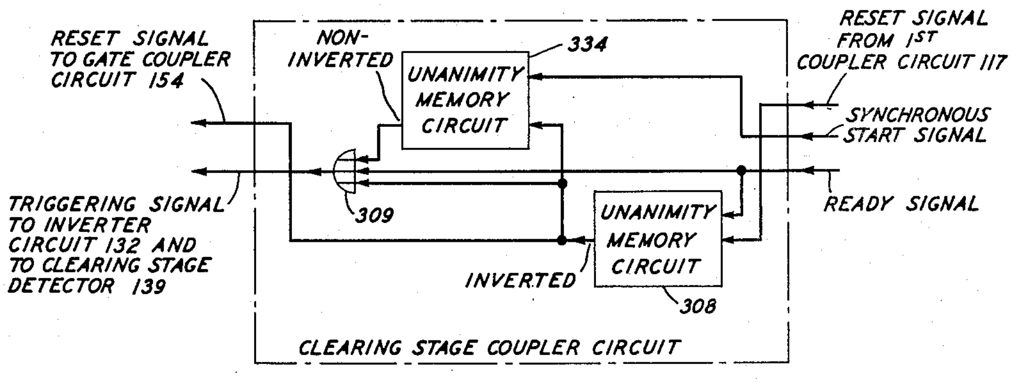
FIG. 3D shows the configuration of the clearing stage coupler circuit of the illustrative encoder of FIG. 1.
Figure 3E:
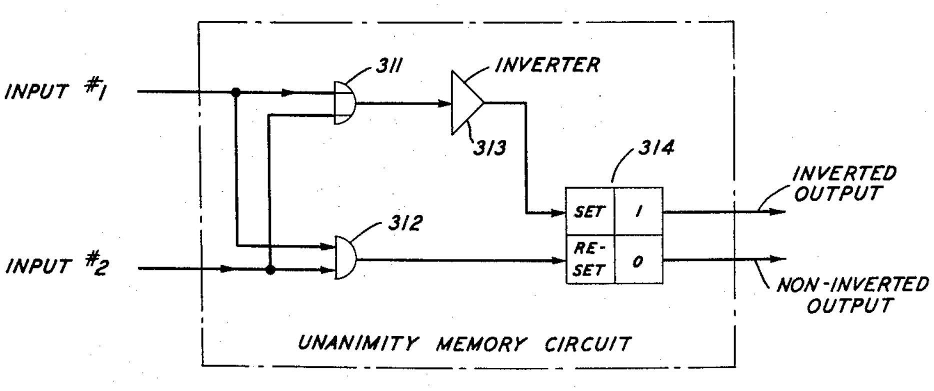
FIG. 3E shows the configuration of a unanimity memory circuit of the type included in each of FIGS. 3A, 3B, 3C, 3D, 4, 5, and 6.

FIG. 3B, which depicts the configuration of the first coupler circuit 117, includes a unanimity memory circuit 303 and an OR circuit 304. FIG. 3C, which shows the configuration of the gate coupler circuit 154, comprises a unanimity memory circuit 306 and an OR circuit 307. And FIG. 3D, which shows the configuration of the clearing stage coupler circuit 128, includes unanimity memory circuits 308 and 334 and an OR circuit 309. The operation of each of the circuits of FIGS. 3B, 3C, and 3D, and also of each of the circuits of FIGS. 3E, 4, 5, and 6, is specified above in connection with the description of the block diagram of FIG. 1 and the manner in which these circuits are interconnected in the diagram of FIG. 1 is clearly indicated in FIGS. 3B, 3C, 3D, 3E, 4, 5, and 6 by the legends associated with the input and output leads thereof.

A typical unanimity memory circuit is shown in FIG. 3E. The circuit there shown includes an OR circuit 311, an AND circuit 312, an inverter circuit 313, and a flip-flop circuit 314. Alternatively, a unanimity memory circuit may be of the form of one of the arrangements described in the copending application of W. G. Hall, Serial No. 850,428, filed November 2, 1959, or of the form described and shown on pages 122–123 of "The Design of a Very High Speed Computer," Report No. 80, University of Illinois Digital Computer Laboratory, October 1957.

In the circuits described above, and in many other possible realizations of a unanimity memory circuit, a portion of the circuit contains regenerative feedback around two active elements, such as transistors, in order to establish a condition in which the circuit can maintain itself in ether of two states of stable equilibrium. Input signals, which may operate to upset one of the states of stable equilibrium and drive the circuit to the opposite state, typically override the regenerative feedback at the terminal of the active element to which they are applied, such as at the base of one of the transistors. In order to obtain the desired balance among input signal levels and feedback signals and active element operating voltage or current levels, a constant bias current is applied through a resistor to the terminal which also receives feedback and input signals. If the bias current is appreciably different from its designed value, it can operate to maintain the circuit in a particular one of its two states, regardless of input signal conditions. Although the bias current is typically supplied from a power source common to many other circuits in a system, it is possible to supply the bias current to a particular internal terminal of each one of a selected group of unanimity memory circuits through auxiliary control equipment 200 shown in FIG. 1 which alters the bias current supplied to these circuits, when the power is first turned on, to such a degree that each circuit connected to the auxiliary control equipment is initially driven to a particular one of its states of stable equilibrium, and is held in this state until a release signal causes the auxiliary control equipment to return the bias currents to their normal values. Note that in the interest of not unduly complicating the diagram of FIG. 1, the suggested connections between the auxiliary control equipment 200 and the selected unanimity memory circuits have not been shown.

By this method, then, it is possible simply and economically to insure that there are established in the logic circuits of this encoder, when the equipment is turned on, the initial conditions necessary to its proper subsequent operation, as described above.

Figures 4, 5, 6:
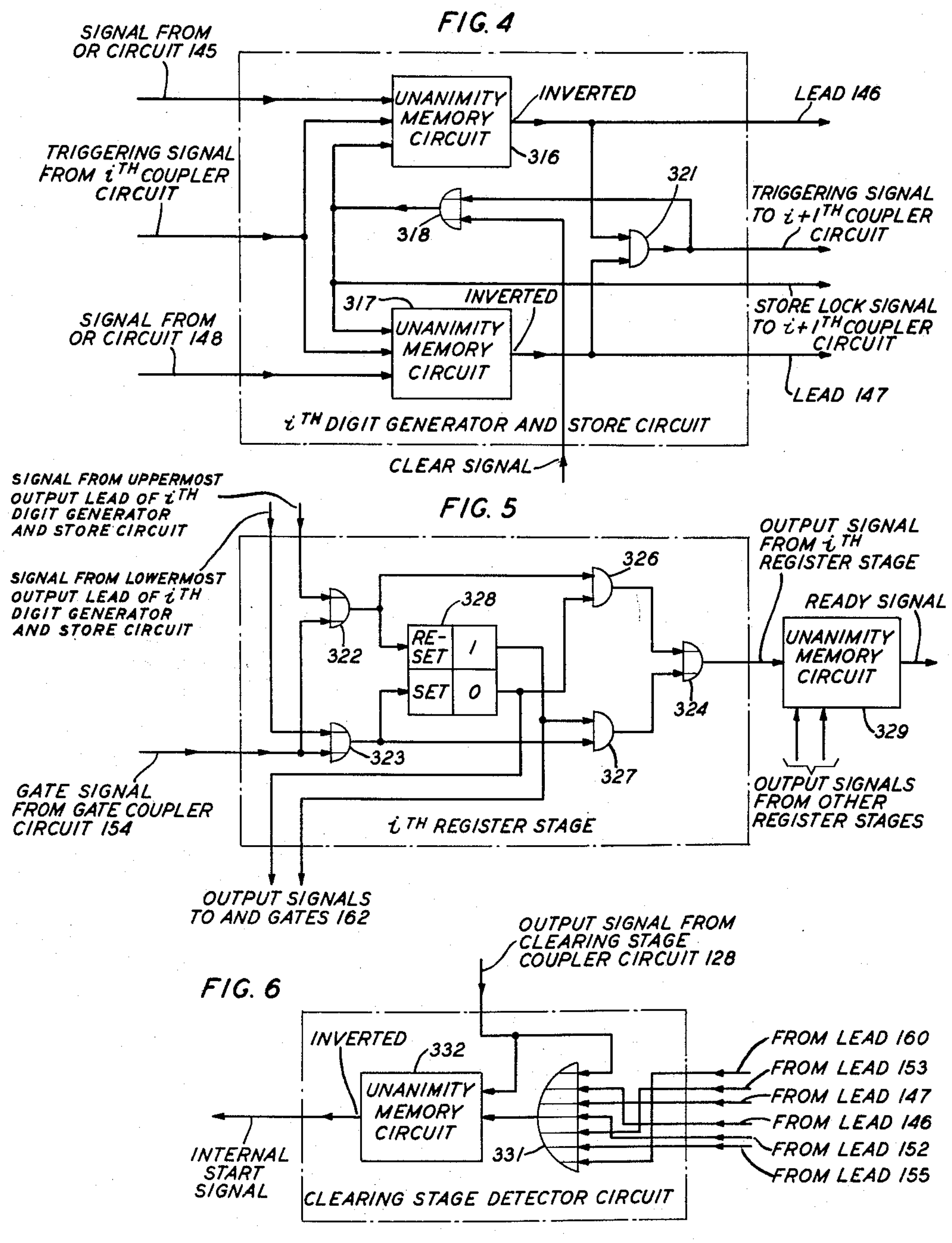
FIG. 4 depicts the arrangement of one of the first, second, and third digit generator and store circuits of the illustrative encoder shown in FIG. 1.
FIG. 5 illustrates the configuration of one stage of the register circuit of the illustrative encoder of FIG. 1.
FIG. 6 shows the configuration of the clearing stage detector circuit of the illustrative encoder shown in FIG. 1.

FIG. 4, which shows one of the digit generator and store circuits 116, 118, and 121, includes a first unanimity memory circuit 316, a second unanimity memory circuit 317, an OR circuit 318, and an AND circuit 321.

FIG. 5, which shows the configuration of one of the stages of the register circuit 158, includes OR circuits 322, 323 and 324, AND circuits 326 and 327, and a flip-flop circuit 328. The output or "1" signal from the depicted register stage is coupled to a unanimity memory circuit 329, to which are also coupled the output signals of the other stages of the register circuit 158. In turn, the "1" output indication of the circuit 329 constitutes a ready signal which, as described above, is coupled both to the controller circuit 108 and to the clearing stage coupler circuit 128.

The flip-flop circuit 328 of FIG. 5 normally has a "1" signal applied to each of its two input leads. The application of a "0" signal to the "set" input terminal of the circuit 328 causes the circuit to provide output signals of the type indicated in the symbol in FIG. 5, i.e., a "0" signal at the upper output terminal and a "1" signal at the lower output terminal. Similarly, the application of a "0" signal to the "reset" input terminal of the circuit 328 causes the circuit to provide output signals inverse to those indicated in the symbol in FIG. 5, i.e., a "1" signal at the upper output terminal and a "0" signal at the lower output terminal.

FIG. 6, which illustrates the arrangement of the clearing stage detector circuit 139, includes an OR circuit 331 and a unanimity memory circuit 332. Finally, it is noted that specific circuit arrangements have not been presented for the transmitting terminal 100, the sampler and buffer store circuit 103, the maximum coding level direct-current source 112, the difference amplifier 111, the inverter circuit 132, the controller circuit 108, the output buffer amplifier and store circuit 163, the receiving terminal 101, the auxiliary control equipment 200 for sequencing power turn-one, and for the various OR, AND, and flip-flop circuits included herein. All of these circuits are clearly considered, in view of the functional descriptions thereof specified above, to be easily realizable by those skilled in the art of digital information processing circuits.

Thus, there has been described herein a specific embodiment of a high speed asynchronous P.A.M.-to-P.C.M. encoder made in accordance with the principles of the present invention. Significantly, the described encoder is characterized by the property of speed-independence, i.e., the final condition thereof, namely, the values of the digits produced thereby, does not depend on the relative speeds of operation of the component circuits of which it is formed.

It is to be understood that the above-described arrangements are only illustrative of the application of the principles of the present invention. Numerous other arrangements may be devised by those skilled in the art without departing from the spirit and scope of the invention.

What is claimed is:

1. In combination in an asynchronous P.A.M.-to-P.C.M. encoder, means for supplying a P.A.M. analog signal which is to be encoded into an $n$-digit pulse code group, means for supplying a signal which is the complement of said P.A.M. analog signal, $n$ generating circuit means respectively representative of the $n$ digits of said pulse code group and responsive to triggering signals for supplying sequentially-occurring digital switching signals, first comparator circuit means responsive to said P.A.M. analog signal and to said sequentially-occurring digital switching signals for converting each digital switching signal into an analog signal and for comparing said converted signal with said P.A.M. analog signal and for providing an output binary signal indicative of the relative magnitudes of said P.A.M. signal and said converted signal, second comparator circuit means responsive to said complement signal and to said sequentially-occurring digital switching signals for converting each digital switching signal into an analog signal and for comparing said converted signal with said complement signal and for providing an output binary signal indicative of the relative magnitudes of said complement signal and said converted signal, and circuit means responsive to said output binary signals from said first and second comparator circuit means for applying sequentially-occurring triggering signals to said $n$ generating circuit means and for providing a gating signal at the completion of the coding of a P.A.M. analog signal into an $n$-digit pulse code group.

2. A combination as in claim 1 wherein said means for supplying a P.A.M. analog signal includes a transmitting terminal for supplying a continuous output message wave, and a sampler and buffer store circuit responsive to said output message wave for providing a P.A.M. message.

3. A combination as in claim 1 wherein said means for supplying a signal which is the complement of said P.A.M. analog signal includes a transmitting terminal for supplying a continuous output message wave, a sampler and buffer store circuit responsive to said output message wave for providing a P.A.M. message, a maximum coding level direct-current voltage source, and a difference amplifier responsive to the application thereto of one pulse of said P.A.M. message and the voltage output of said source for supplying a signal whose amplitude is equal to the voltage output of said source less the amplitude of said one pulse.

4. A combination as in claim 2 further including timing means responsive to the application thereto of said gating signal from said circuit means for applying a timing signal to said sampler and buffer store circuit to cause said sampler and buffer store circuit to provide at its output one pulse of said P.A.M. message.

5. A combination as in claim 3 further including timing means responsive to the application thereto of said gating signal from said circuit means for applying a timing signal to said sampler and buffer store circuit to cause said sampler and buffer store circuit to provide at its output one pulse of said P.A.M. message.

6. In combination in a system for asynchronously converting an input analog signal into a code group having $n$ digit positions, means supplying an input analog signal and the complement thereof, first and second comparator means respectively responsive to said analog signal and its complement, $n$ digit generator and store circuit means each connected to both of said first and second comparator means, said $n$ circuit means being respectively associated with the $n$ digit positions of the code group and being adapted to successively couple digital signals to said first and second comparator means, said first comparator means including first means for successively comparing an input analog signal with the analog significances of the digital signals from said $n$ circuit means, said second comparator means including second means for successively comparing the complement of an input analog signal with the analog significances of the digital signals from said $n$ circuit means, said first and second comparator means being adapted to provide a positive change-of-state signal indicative of the completion by said first and second comparator means of a comparison between the input analog signal and its complement and the analog significance of the digital signal representative of the $i$th digit position, coupling means interconnecting said $n$ circuit means, and means including said coupling means and the $i$th digit generator and store circuit and responsive to said positive change-of-state signal for initiating a comparison operation in the $i+1$th digit position.

7. In combination in an asynchronous encoder, means for supplying an input analog signal which is to be encoded into an $n$-digit pulse code group, means responsive to said input analog signal for supplying the complement thereof, $n$ generating circuit means respectively representative of the $n$ digits of said pulse code group for respectively supplying in sequence digital switching signals, and comparator circuit means responsive to said input analog signal and its complement and each of said sequentially-supplied digital switching signals for respectively comparing each of said digital switching signals with said input analog signal and with the complement thereof and for providing as a result of each comparison operation digitally complementary output signals.

8. A combination as in claim 7 further including coupling means connected to said $n$ generating circuit means and responsive to said digitally complementary output signals for triggering said $n$ generating circuit means in sequence.

9. In combination in an asynchronous P.A.M.-to-P.C.M. encoder, first circuit means for supplying a P.A.M. signal which is to be converted into an $n$-digit pulse code group, second circuit means for supplying which is the complement of said P.A.M. signal, a first comparator circuit responsive to the application thereto of said P.A.M. signal, a second comparator circuit responsive to the application thereto of said complement signal, a coupler circuit representative of the most significant digit position of said $n$-digit pulse code group for providing a triggering signal, said coupler circuit having associated therewith a digit generator and store circuit which is responsive to said triggering signal from said coupler circuit to provide a digital switching signal to each of said first and second comparator circuits, clearing circuit means for applying an internal start signal to said coupler circuit to cause said coupler circuit to supply a triggering signal to said digit generator and store circuit to cause said digit generator and store circuit to apply digital switching signals to said first and second comparator circuits, means including said first and second comparator circuits for converting said digital switching signals into analog signals and for respectively comparing said converted signals with said P.A.M. signal and with said complement signal and for applying digitally complementary signals to said digit generator and store circuit to cause said circuit to store therein an indication of the result of said comparison operation and to provide a completion signal, and third circuit means including an interconnected series arrangement comprising $n-1$ coupler circuits and $n-1$ digit generator and store circuits responsive to said completion signal from said first-mentioned digit generator and store circuit for sequentially storing in said $n-1$ digit generator and store circuits all but the most significant digit of the digits of said $n$-digit pulse code group.

10. A combination as in claim 9 further including register circuit means including $n$ flip-flops, and means responsive to a completion signal from the one of the $n-1$ digit generator and store circuits which is representative of the least significant digit of said $n$-digit pulse code group for gating the signal indications stored in said $n$ digit generator and store circuits into said $n$ flip-flops, and means responsive to the completion of the gating operation for applying an energizing signal to said clearing circuit means to cause said clearing circuit means to apply another internal start signal to said first-mentioned coupler circuit.

11. In combination in an asynchronous encoder, means for supplying an analog signal which is to be encoded, means for supplying a signal which is the complement of said analog signal, first comparator circuit means responsive to said analog signal, second comparator circuit means responsive to the complement signal, first coupler circuit means for providing a triggering signal, digit generator and store circuit means for providing an energizing signal, and second coupler means, said digit generator and store circuit means being responsive to said triggering signal from said first coupler circuit means to provide a digital switching signal to each of said first and second comparator circuit means, said first and second comparator circuit means including means for converting said digital switching signals into analog significance signals and for respectively comparing said analog significance signals with said analog signal to be encoded and its complement and for coupling digital signals representative of the result of the comparison operation to said digit generator and store circuit means to cause said digit generator and store circuit means to store therein an indication of the result of the comparison operation and to lock the stored indication and to provide said energizing signal, said second coupler means being responsive to said energizing signal to provide a reset signal to said first coupler and to provide an output triggering signal.

12. In combination in an asynchronous encoder for converting a P.A.M. analog signal into an $n$-digit pulse code group, first comparator circuit means, second comparator circuit means, generating means for sequentially applying to each of said first and second comparator circuits during the coding of the P.A.M. analog signal digital switching signals respectively representative of the $n$ digit positions of said $n$-digit pulse code group, and means for applying said P.A.M. analog signal to said first comparator circuit means during said coding and for applying the complement of said P.A.M. analog signal to said second comparator circuit means during said coding.

13. In combination in an asynchronous encoder, means for supplying an analog signal to be encoded and for supplying a signal which is the complement of said analog signal, first comparator means responsive to said analog signal, and second comparator means responsive to the complement signal.

14. In combination, means for supplying an analog signal to be encoded and for supplying a signal which is the complement of said analog signal, a digital signal source, and comparator circuit means responsive to said analog signal and its complement and the output representation of said source for providing digitally complementary output signals.

References Cited in the file of this patent

UNITED STATES PATENTS

| | | |
|---|---|---|
| 2,934,746 | Way Dong Woo | Apr. 26, 1960 |
| 2,947,971 | Glauberman | Aug. 2, 1960 |